(12) United States Patent
Tuoriniemi et al.

(10) Patent No.: US 6,470,197 B1
(45) Date of Patent: *Oct. 22, 2002

(54) HEADSET CONTROL SYSTEM FOR OPERATING A MICROCONTROLLER BASED DEVICE

(76) Inventors: Veijo Matias Tuoriniemi, 210 E. 17th St. Apt. 4D, New York, NY (US) 10003-3629; Joseph Michael Allison, 2070 Miami Rd., Euclid, OH (US) 44117

( * ) Notice: Subject to any disclaimer, the term of this patent is extended or adjusted under 35 U.S.C. 154(b) by 0 days.

This patent is subject to a terminal disclaimer.

(21) Appl. No.: 09/306,225

(22) Filed: May 6, 1999

Related U.S. Application Data

(63) Continuation of application No. 08/920,406, filed on Aug. 29, 1997.

(51) Int. Cl.[7] .................................................. H04B 1/38
(52) U.S. Cl. .......................................... 455/575; 455/95
(58) Field of Search .............................. 455/89, 90, 95, 455/66, 335, 351, 569, 556, 557, 575, 568, 149, 151.4, 116; 379/428, 434, 430, 433, 79; 381/26, 12, 74, 300, 91, 334, 183, 187, FOR 1, FOR 9, FOR 150, 384, 370, 378

(56) References Cited

U.S. PATENT DOCUMENTS

| | | | |
|---|---|---|---|
| 4,481,671 A | | 11/1984 | Mätzold |
| 4,484,029 A | | 11/1984 | Kenney |
| 4,591,661 A | * | 5/1986 | Benedetto et al. ........... 455/556 |
| 4,654,883 A | * | 3/1987 | Iwata .......................... 455/575 |
| 4,882,745 A | * | 11/1989 | Silver .......................... 455/568 |
| 5,001,774 A | | 3/1991 | Lee |
| 5,109,543 A | | 4/1992 | Dissosway |
| 5,191,602 A | | 3/1993 | Regen |
| 5,193,221 A | | 3/1993 | Saginao |
| 5,247,705 A | * | 9/1993 | Attig et al. ..................... 455/74 |
| 5,504,812 A | * | 4/1996 | Vangarde ..................... 379/430 |
| 5,542,103 A | * | 7/1996 | Mottier et al. .............. 455/566 |
| 5,596,638 A | * | 1/1997 | Paterson et al. ............ 455/568 |
| 5,646,979 A | | 7/1997 | Knuth |
| 5,650,776 A | | 7/1997 | Mitchell |
| 5,694,467 A | * | 12/1997 | Young, III ................... 379/430 |
| 5,745,859 A | | 4/1998 | Takenaka |
| 5,821,874 A | | 10/1998 | Parvulescu |
| 5,826,199 A | | 10/1998 | Maeda |
| 5,867,768 A | * | 2/1999 | Onda ........................... 455/66 |
| 5,890,074 A | * | 3/1999 | Rydbeck et al. ............ 455/558 |
| 5,913,163 A | * | 6/1999 | Johansson .................... 455/426 |
| 5,978,689 A | * | 11/1999 | Tuoriniemi et al. ......... 455/569 |
| 6,263,216 B1 | * | 7/2001 | Seydoux et al. ............. 455/564 |

* cited by examiner

*Primary Examiner*—Nay Maung
*Assistant Examiner*—Jean A. Gelin
(74) *Attorney, Agent, or Firm*—Charles E. Bruzqa

(57) ABSTRACT

A headset control system for operating a microcontroller based device includes a microphone, a first and a second speaker, and a user operated switch. The switch selectively disables said first speaker in a first state or said microphone in a second state. A momentary switch creates patterns of momentary switching from one of a first, a second and a third state to at least one other state and back. A switch detector comprises a plurality of comparators to implement threshold logic and produces a signal indicating the respective states of said user-operated switch and said momentary switching means. A microcontroller responsive to said switch detector includes a means to differentiate between different switching patterns of said momentary switching means and initiates respective function as a function of a pattern of momentary switching and state of said user-operated switch and current operational mode.

24 Claims, 9 Drawing Sheets

Fig. 6

| State> | Stand-by | Receiving | Call initiating | Message 1) receiving | Broadcast radio | CD/ Information storage retrieval |
|---|---|---|---|---|---|---|
| Boom Down (Mic.) | | auto answer | | | | |
| Click | 1) on-hook 2) redial | Forward to Answering machine | Flash-hook | Listen message | not available | not available |
| Double-Click | Dial #1 from memory | Forward to other # | Mute | Forward to storage | not available | not available |
| Tripple-Click | Dial #2 from memory | TBD | TBD | TBD | not available | not available |
| Hold | listen messages from storage | output message | TBD | TBD | not available | not available |
| Push To Bottom | Giving a voice command | TBD | Giving a voice command | TBD | Giving a voice command | Giving a voice command |
| Turn Boom up | auto answer off | | terminating a call | TBD | operations availeble | operations available |

Fig. 7

| State> | Stand-by | Receiving calls | Call initiating | Message receiving 1) | Broadcast radio | CD/ Information storage retrieval |
|---|---|---|---|---|---|---|
| Boom up (Spkr.) | | | | | | |
| Click | not available | Forward to Answering machine | not available | Listen message | Scan up | Skip up |
| Double-Click | not available | Forward to other # | not available | Forward to storage | Scan down | Skip down |
| Tripple-Click | not available | TBD | not available | TBD | Pause/play | Pause/play |
| Hold | not available | TBD | not available | TBD | Change bw AM/FM | Repeat |
| Push To Bottom | not available | TBD | not available | TBD | on/off | on/off |
| Turn Boom down | Giving a voice command | Giving a voice answer a call | not available | TBD | Giving a voice command | Giving a voice command |

1) Short messages: pager, e-mail, voice mail
TBD, To Be Determined

HEADSET CONTROL SYSTEM FOR OPERATING A MICROCONTROLLER BASED DEVICE

This application improves on application Ser. No. 08/920,406, now U.S. Pat. No. 5,978,689 filed Aug. 29, 1997, hereby fully incorporated by reference.

FIELD OF INVENTION

This invention relates to headsets, particularly headset used to give commands to a microcontroller based device.

BACKGROUND OF THE INVENTION

In the embodiments disclosed in the application, gaining random access to various functions using the momentary (normally-closed) headset switch involves pushing the button in various patterns (click, double-click, hold, etc.). The off-hook detector detects the two states of the push button switch by sensing the DC voltage to ground of the line that is broken by the push button switch.

Since there are two headset interconnect wires (along with a third, common ground return), it is possible to have two such switches: one for each wire. The switches would be independent system inputs, having separate (but identical) off-hook detectors and separate input lines to the microcontroller. The term, switch detector, would then be more appropriate than, off-hook detector. The second button could be dedicated to one function such as, voice command, leaving the other button free for the remaining functions. Rather than two buttons, a single button having three positions could be used with the two-wire scheme wherein one of the three switch positions would be detected by the second switch detector. Using the second wire for push button switch detection has a drawback, however: the wire is no longer free for the headset detect function. It would be desirable to find a solution to this dilemma.

DRAWING FIGURES

FIG. 6 shows an exemplary table of momentary functions, boom down.

FIG. 7 shows an exemplary table of momentary functions, boom up.

SUMMARY OF THE INVENTION

Several objects and advantages of different embodiments and variations of the invention are:

The capability of giving commands to a microcontroller either by voice command through a voice command detect circuit or performing predetermined momentary switch functions. Momentary functions can partially overlap with voice command, since in noisy environment giving voice command might not be possible. Momentary functions are useful e.g. in discreet situations when talking might not be appropriate or allowed.

By placing the operative switches to headset instead of operating the device from handset or main housing makes using of the device fast and easy. Standard 3-wire connections can be used to reduce costs and still have theoretically unlimited options to operate the device.

DETAILED DESCRIPTION OF THE INVENTION

Figure 1:
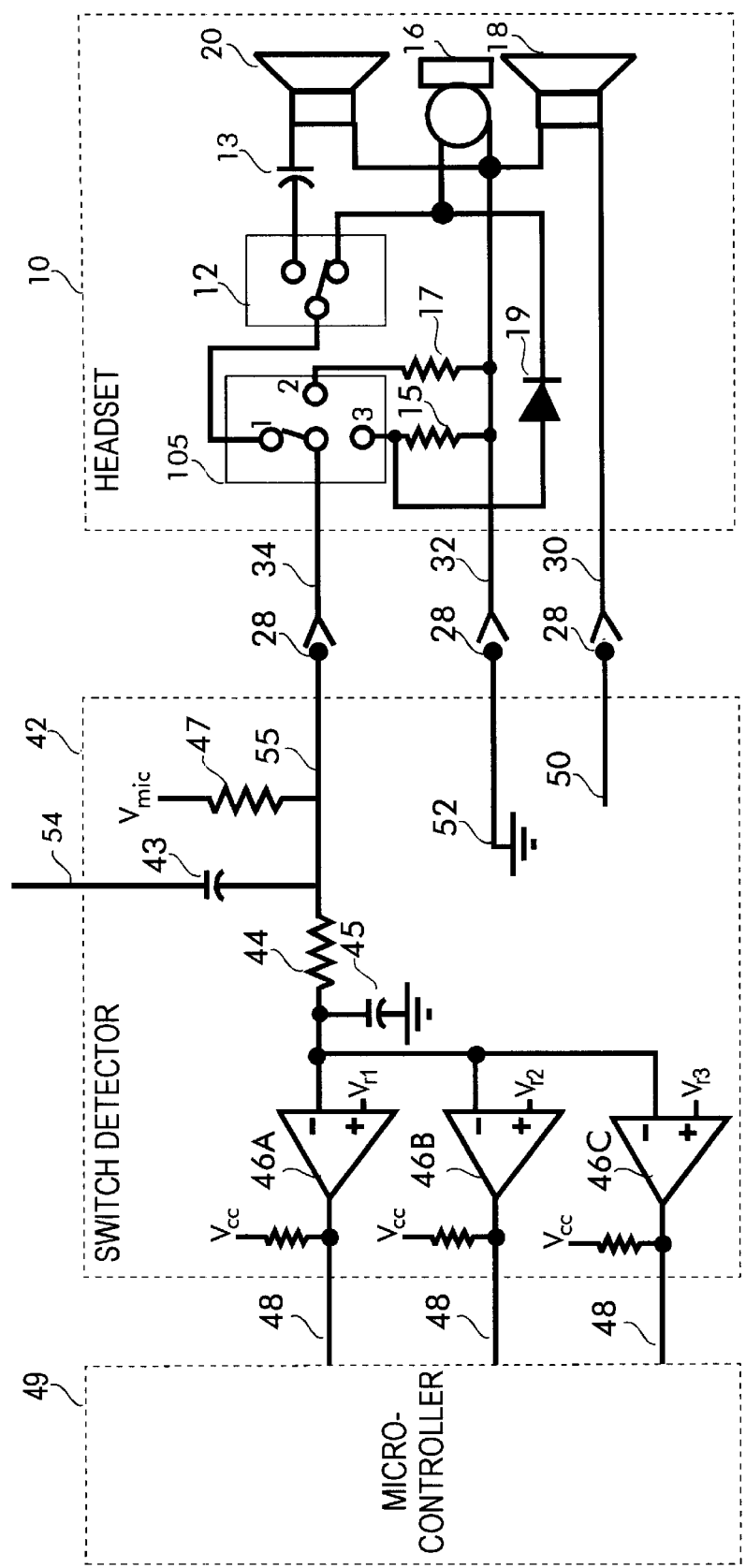
FIG. 1 shows a circuit diagram of a headset and a switch detector with a three position momentary switch.

In application Ser. No. 08/920,406 filed Aug. 29, 1997, now U.S. Pat. No. 5,978,689 only two switch states could be detected per wire because only two logic levels, high and low voltage, were designed for. This limitation is removed with the application of threshold logic. Threshold logic assigns a different level of voltage (or current) to each switch position so that, there is no theoretical limit to the number of switch states that could be detected per wire. FIG. 1 shows an example of four-level threshold logic applied to a single wire to detect the switch positions in the headset 10. The four levels are set by the three threshold voltages, Vr1, Vr2, Vr3, applied respectively to the three comparators, 46A, 46B, 46C.

The comparators detect the voltage on line 55 and provide binary outputs on the microcontroller input lines, 48A, 48B, and 48C. Any one of the three comparators has a high output whenever the DC input voltage at line 55 is below the reference voltage for that particular comparator, otherwise the output of that particular comparator is zero. Assuming that the threshold voltages increase in steps such that, Vr1<Vr2<Vr3, the output states of the three comparators are related to the voltage V55 at line 55 as follows.

TABLE 1

| Level | V55 | 48A | 48B | 48C |
|---|---|---|---|---|
| 1 | 0 < V55 < Vr1 | 1 | 1 | 1 |
| 2 | Vr1 < V55 < Vr2 | 0 | 1 | 1 |
| 3 | Vr2 < V55 < Vr3 | 0 | 0 | 1 |
| 4 | Vr3 < V55 | 0 | 0 | 0 |

The headset contains a three-position push button switch 105 and a two-position boom switch 12. The circuit has been designed such that each combination of switch positions results in a DC voltage at line 55 corresponding to one of the four levels listed above. An example of circuit values along with logic levels is listed in Table 2 below. First column shows the switch 12 position in upper boom position where the switch is connected to the speaker and in lower position where the switch is down in front of the mouth position. Second column shows the three-position momentary switch state in upper rest position, middle position and in fully down pressed position. Exemplary values and comparator outputs representing the switch 12 and switch 105 combinations are shown in the following columns.

Figure 2:
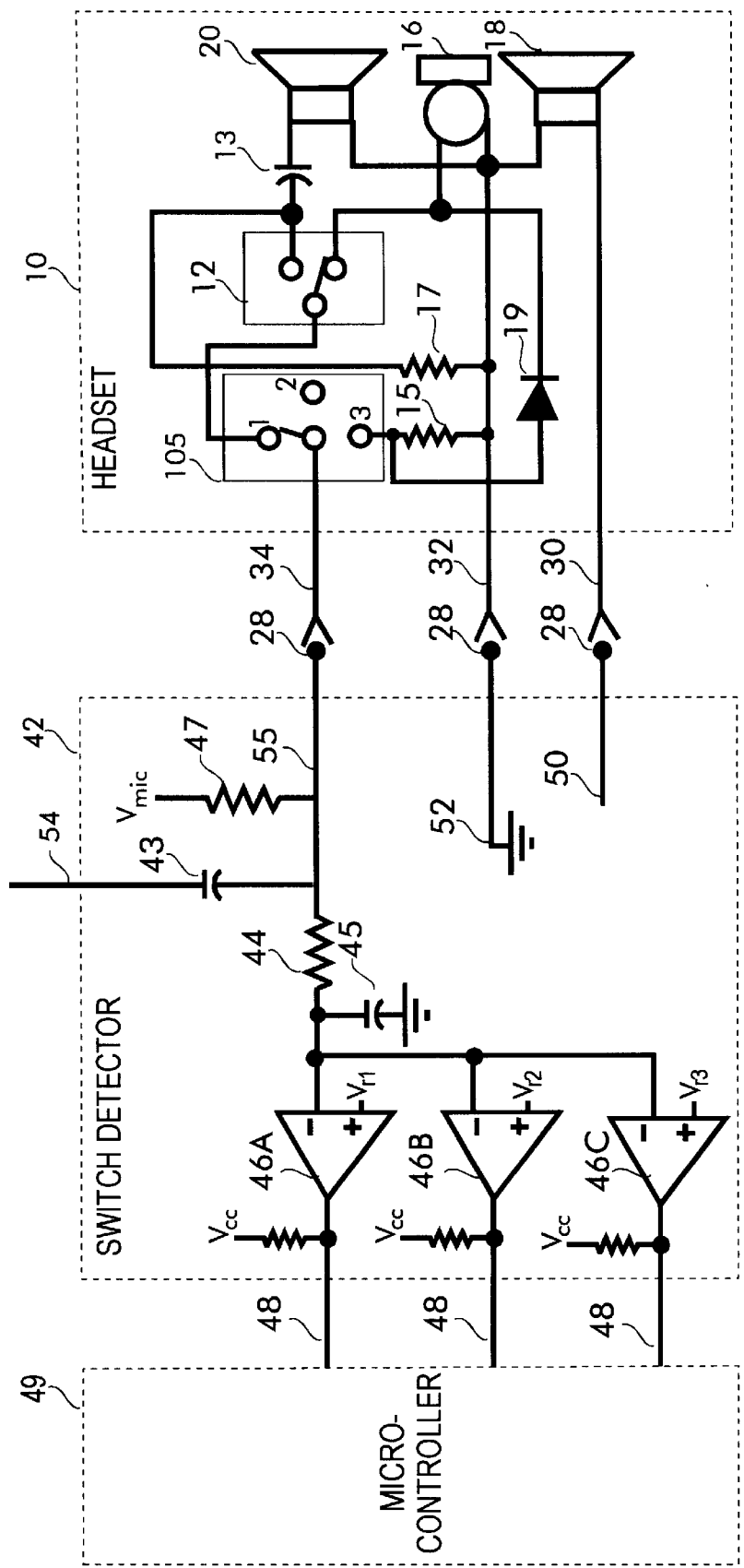
FIG. 2 shows a circuit diagram of a headset and a switch detector with a three position momentary switch having a open mid-position.

FIG. 2 is similar to FIG. 1 except that the mid-position of the push button switch is open. The circuit values and logic levels for this second example are listed in Table 3 below.

TABLE 2

Example values for FIG. 1

| Boom Sw. 12 Pos. | Push B. Sw. 105 Pos. | Resistance to ground at line 34 | DC voltage to ground at line 34 | Comparator Outputs | | |
|---|---|---|---|---|---|---|
| | | | | 46A 5.3 v | 46B 8.3 v | 46C 15 v (refs.) |
| Up (Spkr.) | Up (rest) | open | 20 v < no refs. | 0 | 0 | 0 |
| Up (Spkr.) | Mid. | R17 = 2k ohm | 10 v < 15 v | 0 | 0 | 1 |
| Up (Spkr.) | Down | 1k‖mic = 0.5k | 4v < all refs. | 1 | 1 | 1 |
| Down (Mic.) | Up (rest) | mic = 1k | 6.7 v < 15 v < 8.3 v | 0 | 1 | 1 |
| Down (Mic.) | Mid. | R17 = 2k ohm | 10 v < 15 v | 0 | 0 | 1 |
| Down (Mic.) | Down | 1k‖mic = 0.5k | 4 v < all refs. | 1 | 1 | 1 |

Resistor 47: 2k ohm
Resistor 15: 1k ohm
Resistor 17: 2k ohm
Mic16: 1k ohm
Vmic: 20 v
Reference Voltages:
Vr1: 5.3 v
Vr2: 8.3 v
Vr3: 15 v

TABLE 3

Example values for FIG. 2

| Boom Sw. 12 Pos. | Push B. Sw. 105 Pos. | Resistance to ground at line 34 | DC voltage to ground at line 34 | Comparator Outputs | | |
|---|---|---|---|---|---|---|
| | | | | 46A 5.3 v | 46B 8.3 v | 46C 15 v (refs.) |
| Up (Spkr.) | Up (rest) | R17 = 2k | 10 v < 15 v | 0 | 0 | 1 |
| Up (Spkr.) | Mid. | Open | 20 v < no refs. | 0 | 0 | 0 |
| Up (Spkr.) | Down | 1k‖mic = 0.5k | 4 v < all refs. | 1 | 1 | 1 |
| Down (Mic.) | Up (rest) | mic = 1k | 6.7 v < 15 v < 8.3 v | 0 | 1 | 1 |
| Down (Mic.) | Mid. | Open | 20 v < no refs. | 0 | 0 | 0 |
| Down (Mic.) | Down | 1k‖mic = 0.5k | 4 v < all refs. | 1 | 1 | 1 |

Resistor 47: 2k ohm
Resistor 15: 1k ohm
Resistor 17: 2k ohm
Mic16: 1k ohm
Vmic: 20 v
Reference Voltages:
Vr1: 5.3 v
Vr2: 8.3 v
Vr3: 15 v

Operation of the First Embodiment

Disclosed headset control system is intended to be used with a cellular telephone or other audio devices. The term "audio device" refers to a contrivance or an invention serving a particular purpose relating to the broadcasting, reception, or reproduction of sound. Audio devices that can be used individually or combined are e.g. cellular telephone, AF/FM radio, digital radio, information signal storage retrieval, voice recognition systems and a synthesizer. The term "information signal" refers to a time varying physical quantity representing desired intelligence, often an audible sound or an electrical signal. The term "retrieval" refers to production or reproduction of a stored information signal from the storage medium characteristics.

FIG. 2 shows an embodiment where the second position of the push button switch 105 is open. Opening of a line 34 in predetermined pattern by pushing the three-state switch 105 to a second open position sends a system input to the microcontroller. An application using time delay loops with decision and branch-to-subroutine statements decodes various inputs differentiated by the number of repeated switch closures or by the time the common input line is kept open.

Click, double click and hold, commonly known from computer mouse, are used to give system inputs. The term "click" refers to a short opening of an input line, preferably shorter than 0.5 seconds. The term "double click" refers to a repeat of a click, in predetermined time, preferably shorter than 0.5 seconds, after the first click. "Hold" refers to a longer opening than click, preferably longer than 0.5 seconds.

When a system input is received, the microcontroller sends a response signal to the speaker 18. The response signal provides user a prompt to recognize the start and end of a system input. When the line is kept open more than 0.5 seconds the response signal changes tone to differentiate "click" and "hold" inputs.

In a further embodiment switch 12 state is dependent on the boom position. When the boom is in front of the mouth switch 12 is connected to the microphone. Stored boom position connects switch 12 to speaker.

In order to avoid long open circuit condition the boom dependent switch 12 can be designed to change state quickly somewhere in the middle of the upper and lower mouth position. If, for example, user wants to turn the boom in front, the switch 12 keeps the connection to the speaker until the boom is in the middle of the rotation. In this middle position the switch 12 changes the state to the microphone position. This microphone state is kept in all adjustable, in-front-of-the-mouth boom positions.

Alternatively, instead of using switch 105 to open line 34, the boom dependent switch 12 can be used. User manually toggles the boom backwards from a speaker position or downward from the microphone position to a open state and back.

In order to avoid mistakenly given system inputs, software is designed to ignore glitches and bounces, open or closed states, less than 0.05 seconds. The system will delay acting upon changes until the input settles. The term "settle" refers to state where no action has been taken place during the past 0.05 seconds.

General software response to switch inputs is determined by function: Present System State+Switch input=New System State.

For example, assume user inputs one click. The software response can depend on the state of the system immediately before the input, or the software response can ignore the state of the system. Assume the user is talking on the telephone when he enters a single click. Software will activate a certain function TBD1 (To Be Determined). Next, assume the user is listening to the CD player when he enters a single click. This time, the software can activate an other function TBD2. So the same input, single click, can be context sensitive.

Receiving of an external messages can change state of the system. When an external message is received, microcontroller alerts user through speaker and changes to designated state. In this receiving state system input signals are changed to control the incoming message.

Figure 8:
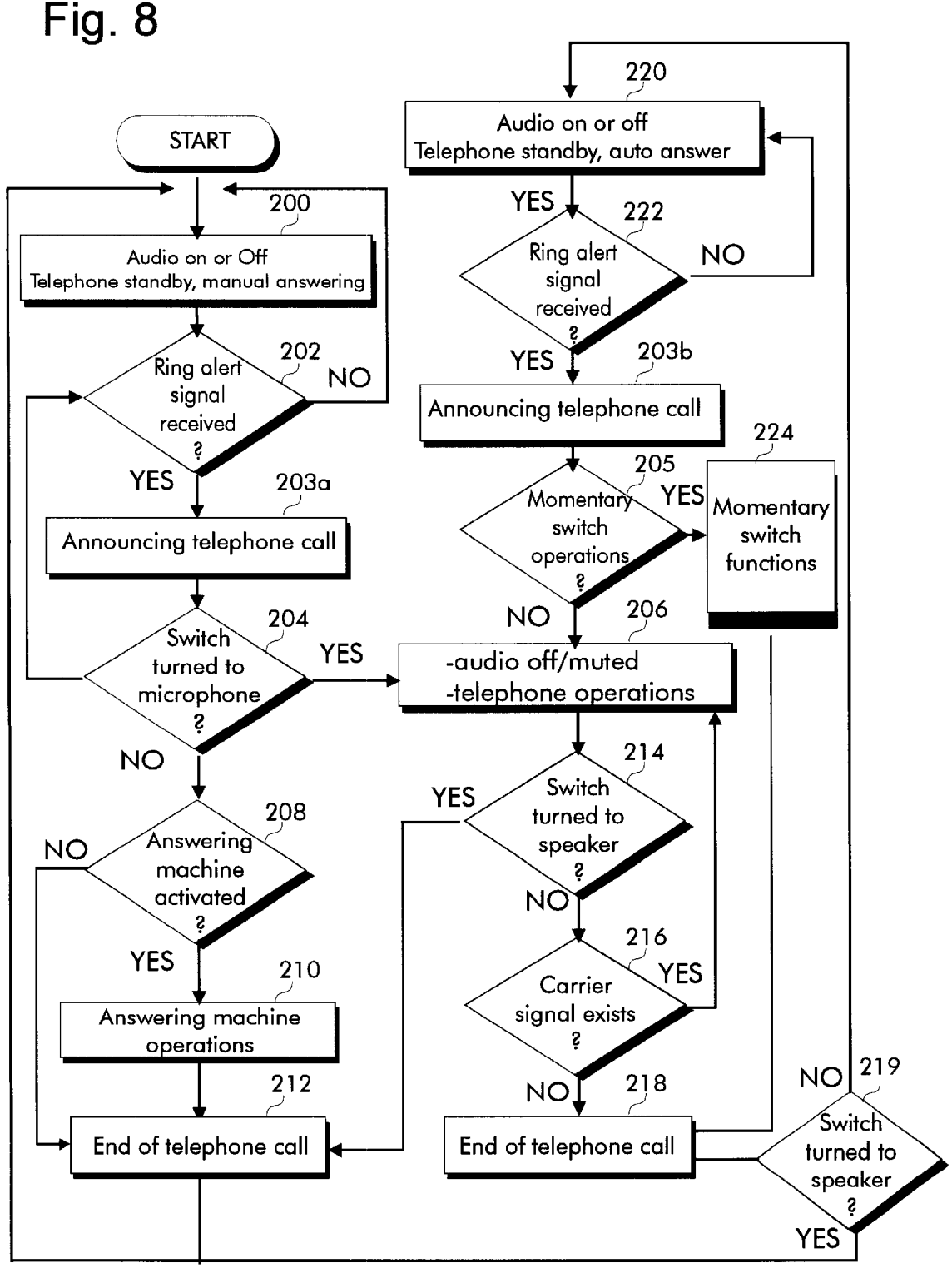
FIG. 8 shows a flowchart of receiving a telephone call/telephone call initiating mode.

For example in FIG. 8 when a telephone call is received and alarm signal is heard while listening to stereophonic music through speakers, the call can be forwarded to e.g. an answering machine 210 by a click 208 without interrupting music listening. In call receiving state a click, which, for example in radio listening state signals microcontroller to scan station up, is temporarily used to control the telephone instead.

FIG. 2 shows an alternative configuration with closed second, middle state of switch 105. No system inputs given or response signal is heard when the line 34 is opened. System input is only given and the response signal is heard when the switch 105 is connected to a second state.

Momentary switch and voice command giving switch is combined to a single three-position momentary type push button switch mounted in/on said headset. The spring biased button switch has a first rest state where it always returns. In order to push the button type switch to the second state user is required to use certain force. Second switch position has a mechanical threshold separating different switch states. Increased force is needed to push the switch to the third state.

Momentary switch system inputs are given by toggling the switch 105 between first and second state and voice commands are given by pushing the switch to third position.

User might pause in the middle position after giving a voice command. In order to avoid incorrect input the software can be designed to ignore the middle input. The software can be designated to wait for the rest position before responding to any other switch states. The switch is released to the first, rest state after each position. If the software does not sense the rest state, then no action will be taken until the rest state is sensed.

Figure 3:
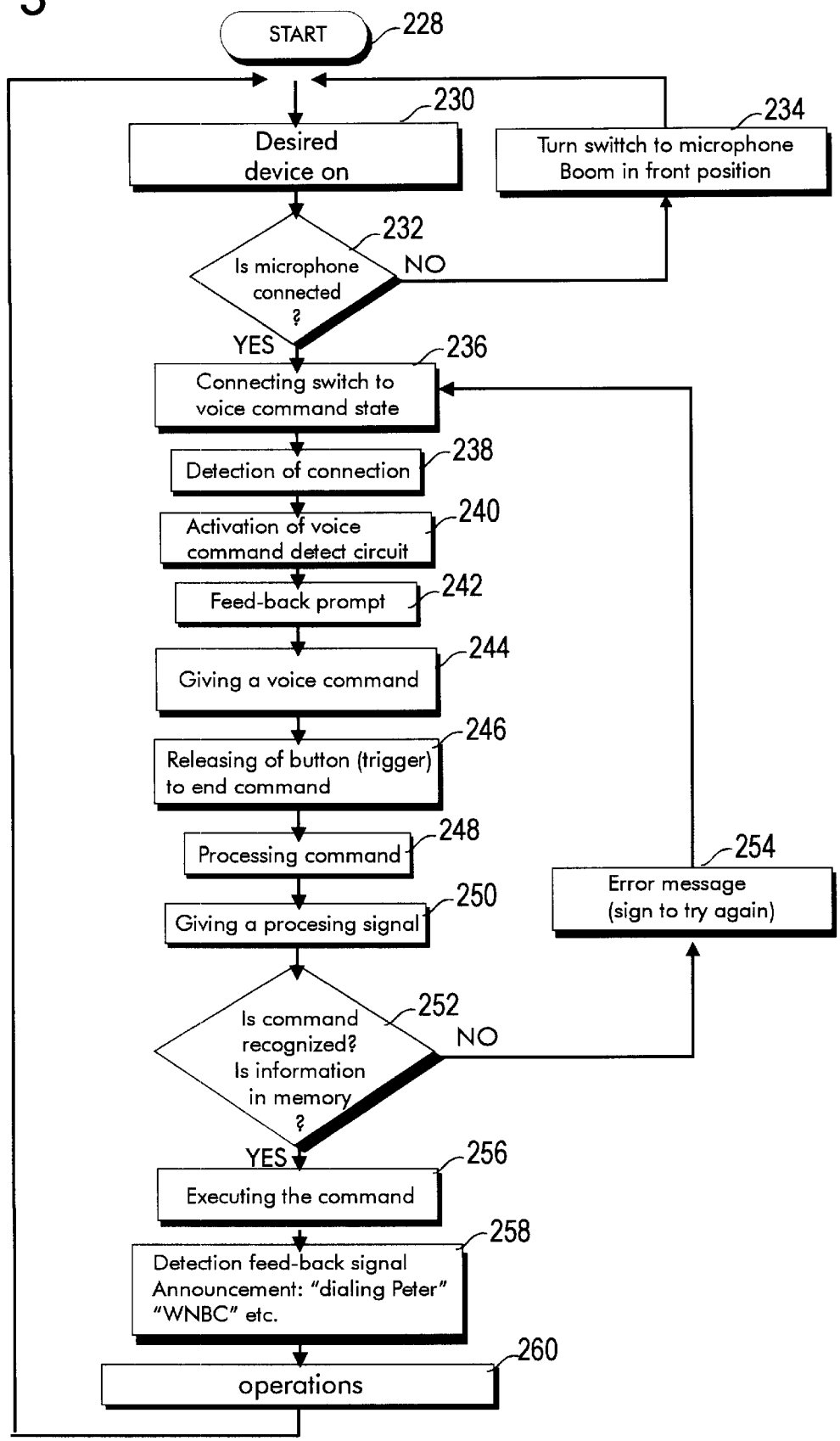
FIG. 3 shows flowchart of a first method to give a voice command.

Voice command input 236 in FIG. 3 to a voice command detect circuit is given by connecting switch 105 to a third position 236. After getting an input signal 238, microcontroller 240 sends a short ready signal 242 to user to start a command. This prompt is a signal the voice command detect circuit is ready to receive an input. User gives a voice command 244 by talking to the microphone and simultaneously keeping the switch 105 connected to third state. Releasing the switch 105 terminates the command. Releasing the switch is a trigger 246 for a voice command detect circuit that input is ready to be accepted.

Processing of a voice command 248 can have several steps such as analog-to-digital converting followed possibly by e.g. automatic gain control, echo cancellation and voice activity detection in order to present the recognizer with as good a signal as possible. A voice recognition means making a comparison between the voice command and a sample command stored in a memory and a control circuit for executing the command.

During processing of a command microcontroller gives user a processing signal 250. This processing signal is an echo simulating time glass on computer screen showing the input has been accepted and it is in process.

After processing 248, user is given an acknowledgment signal. Depending upon recognition 252 of the command, selected item 256 is announced or an error message 254 is heard. Error message is a signal for user to try again.

Figure 4:
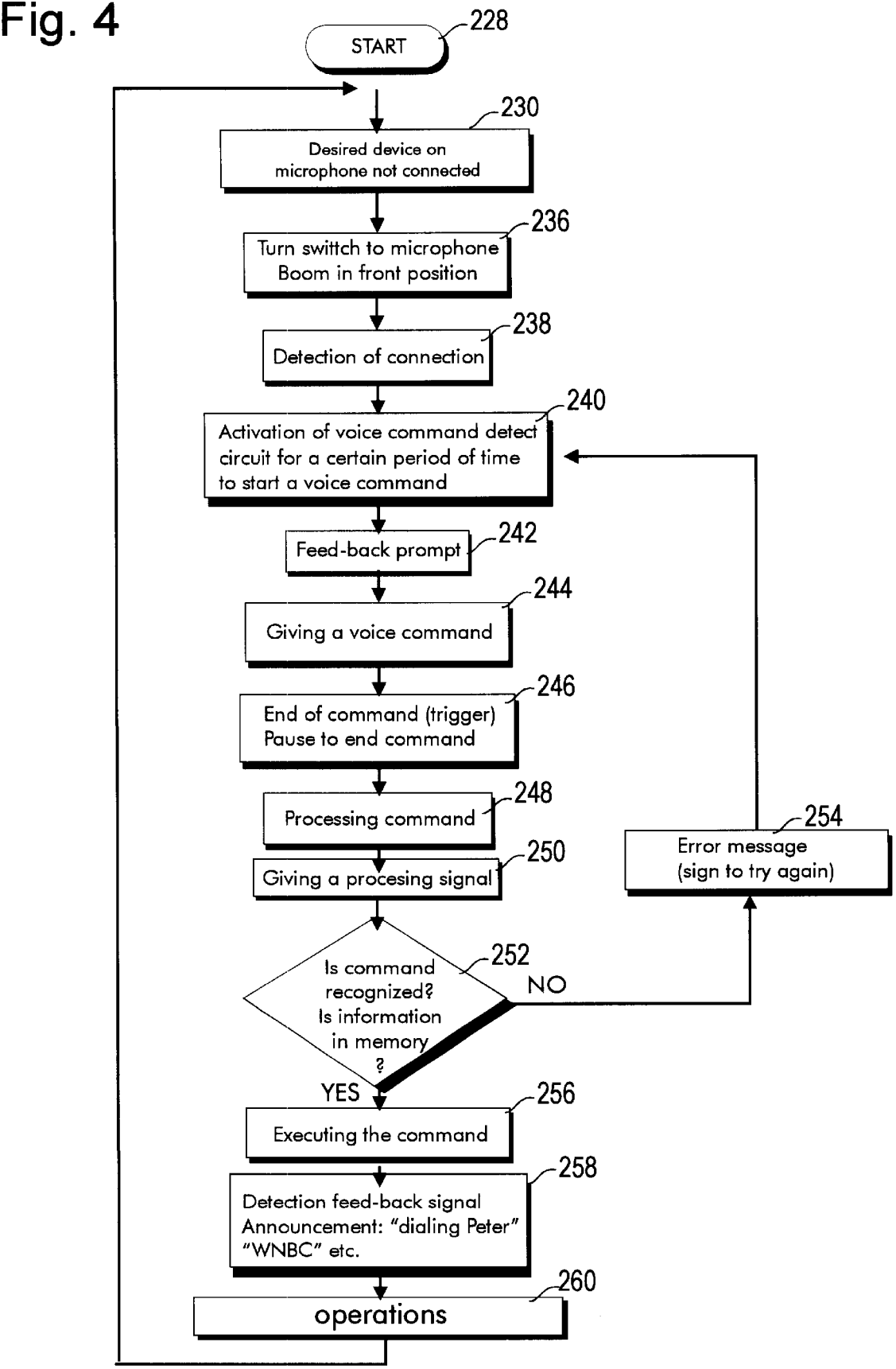
FIG. 4 shows flowchart of a second method to give a voice command.

In FIG. 4 an alternative way to give a voice command is to program software to give user a predetermined period of time to start a voice command after connecting 236 the microphone on line. Moving the boom in front-of-the-mouth position connects microphone.

Prompt is heard after the activation 240. User gives a command 244 by talking to the microphone. Pausing after giving a voice command, i.e. speech signal is not present, is a trigger 246 for the voice command detect circuit that input is ready to be accepted.

If given predetermined period of time is not used to start a voice command, the system automatically turns to a stand-by/auto answer state or other (TBD3) state.

Figure 5:
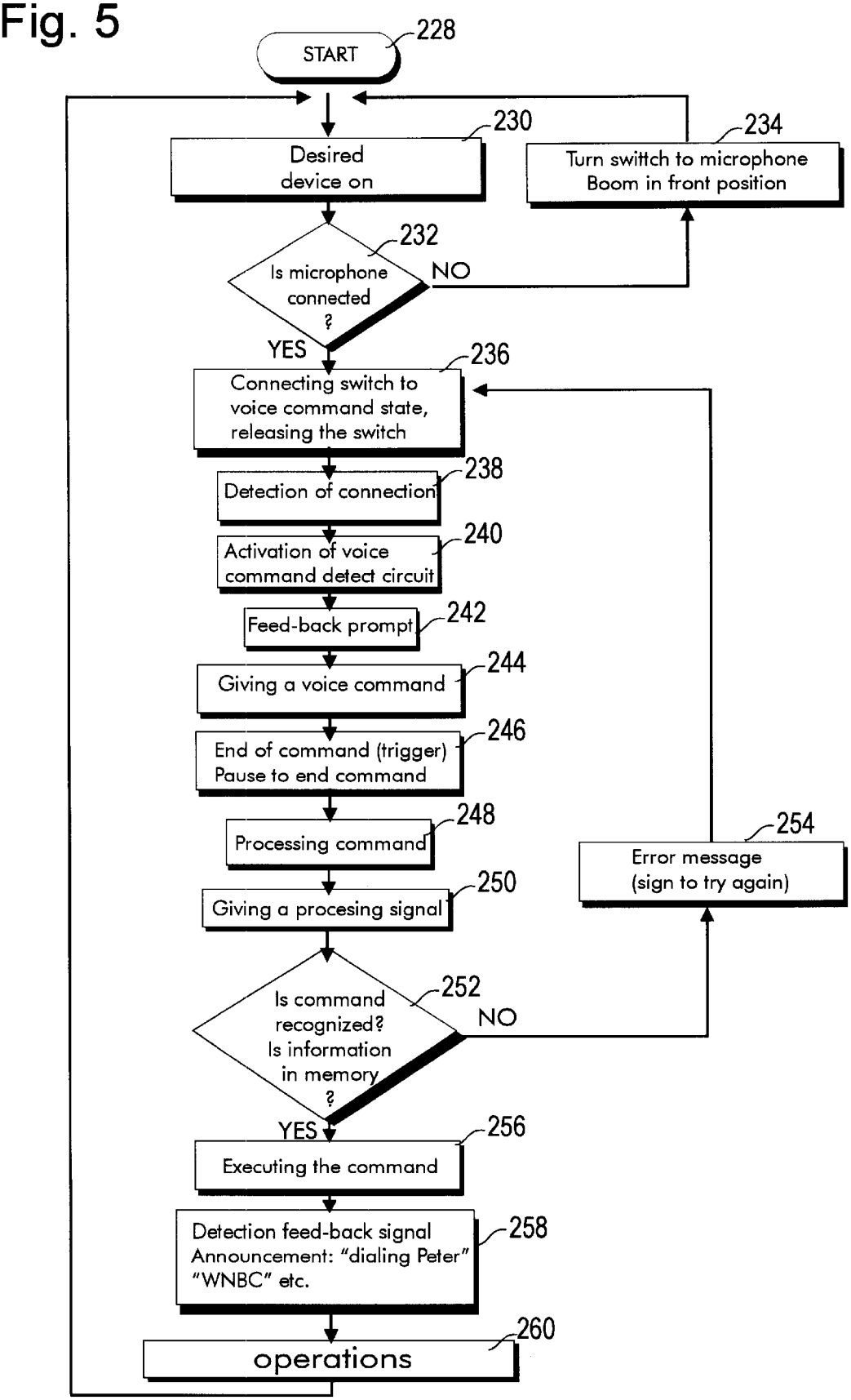
FIG. 5 shows a flowchart of a third method to give a voice command.

FIG. 5 shows how software can also be programmed to activate voice command detect circuit by connecting the switch 105 shortly to third state 236. After connection user releases the button. Connection is detected 238, voice command detect circuit activated 240 and prompt signal 242 is given to user to start command. User is given a predetermined time to start a command. After a spoken command user pauses 246. Pause is detected by software and it ends the command.

FIG. 6 shows an exemplary table of momentary functions when user operated switch 12 is connected to the microphone 18. Depending on the current state; Stand-by, receiving calls on automatically, call initiating, message receiving, broadcast program listening, audio player listening etc, the momentary operations; click, double-click, triple-click and hold and pushing the switch to the third state have different context sensitive results.

FIG. 7 shows an exemplary table of momentary functions when user operated switch 12 is connected to the speaker 20.

FIG. 8 shows a flowchart of receiving a phone call in manual and automatic answering mode. In start position telephone is in stand-by mode ready to receive incoming calls 200. When ring alert signal 202 is received the incoming call is announced in predetermined way. Different ways to announce the call is described in FIG. 9. User answers to the call by turning the user-operated switch to the microphone position 204. Possible audio program is either turned off or muted and telephone operations are turned on 206. Turning the switch back to the speaker position 214 or if the carrier signal doesn't exist 216 ends the call 218. Connecting the user-operated switch back to speaker position turns the device back to initial mode. If the switch is kept in microphone position the telephone is ready to receive calls automatically 220 without switch operations. When ring alert signal 222 in auto answer mode is received the call is announced same way as in manual answering mode. User is given a predetermined period of time to perform momentary operations 224 in order to forward the call to an answering machine, forward the call to another telephone number or give a caller an output message from a storage. Functions are listed in exemplary table in FIG. 6. After momentary operations the call is terminated 218 and the device returns to an idle mode.

If user in manual answer mode doesn't turn the switch to the microphone position 204 the call is forwarded to a possibly activated answering machine 210 otherwise call is terminated 212 by the absence of the ring signal.

Figure 9:
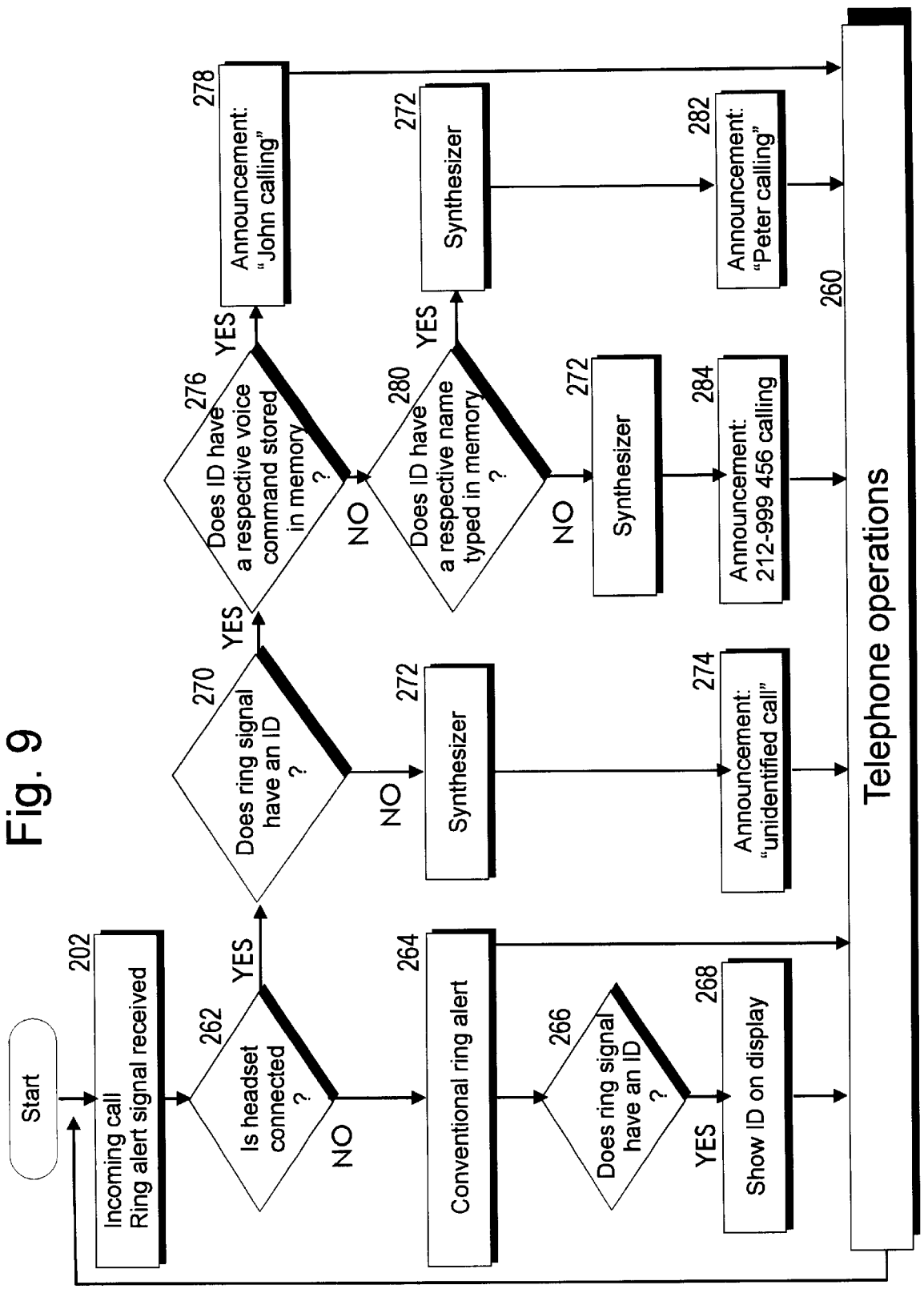
FIG. 9 shows a flowchart of announcing an incoming call/audio listening mode.

FIG. 9 shows a flowchart describing the ways to announce an incoming phone call. The program detects the connection 262. If headset is not connected conventional ring alert signal 264 is heard from the handset. If the ring signal carries an ID string 266 the ID is showed 268 on phone display.

If the headset is connected and the identification 270 is negative and synthesizer is employed, and unidentified-call-message 274 is heard through the speaker. If the identification 270 is positive, the program looks for a respective voice command 276 from the memory. If voice command is found, the name of the caller is announced 278 by the stored voice. In a case the voice command is not found, the program looks for a typed ID from the memory 280. If the typed ID is found and synthesizer 272 is employed, the name of the caller is announced 282. If typed ID is not found and ID string in a ring signal is recognized and synthesizer 272 is employed, the number of the caller is announced 284. Telephone operations 260 follow the announcement.

While the invention has been described with respect to specific embodiments by way of illustration, many modifications and changes will occur to those skilled in art. It is, therefore, to be understood that the appended claims are intended to cover all such modifications and changes as fall within the true scope and spirit of the invention.

We claim:

1. A headset control system for operating a microcontroller based device comprising;
   a) a microphone;
   b) a first and a second speaker;
   c) a user operated switch for selectively activating said microphone in a first state or deactivating said microphone in a second state;
   d) a resiliently biased momentary switching means for creating patterns of momentary switching from a rest position to at least one depressed position and back;
   e) a switch detector comprising plurality of comparators to implement threshold logic with more than two logic levels, producing a signal indicating the respective states of said user operated switch and said momentary switching means; and
   f) a control means responsive to said switch detector including a means to differentiate between different switching patterns of said momentary switching means for initiating respective function as a function of a pattern of momentary switching and state of said user-operated switch and current operational mode.

2. The system of claim 1, further comprising a boom depending from said headset; said microphone being located on said boom; said boom having a mouth position when said microphone is located to receive audible voice signal from user's mouth and an off mouth position when said microphone is located elsewhere; a user adjusting position of said boom for manipulating said user operated switch.

3. The system of claim 1 wherein said user operated switch is used to create patterns of momentary switching system inputs by opening a line from a connected state to an open state and back.

4. The headset system of claim 1, wherein said headset and said microcontroller-based device are interconnected by a maximum of three wires for enabling said control means to initiate said respective function.

5. The headset system of claim 4 using said interconnect system to communicate to said microcontroller based device, the status of switches mounted in/on said headset, said status being associated with DC voltage having more than two logic levels.

6. The headset system of claim 1 wherein said momentary switching means is a single multi-position momentary type push button switch mounted in/on said headset.

7. The system of claim 1, wherein said pattern of momentary switching includes an opening or closing of a line lasting no more than 0.5 seconds.

8. The system of claim 1, wherein said pattern of momentary switching includes two openings or closings of a line each lasting no more than 0.5 seconds.

9. The system of claim 1, wherein said pattern of momentary switching includes switching an opening or closing of a line longer than 0.5 seconds.

10. The headset system of claim 1 further comprising;
    a) a voice command detect circuit coupled to said microphone for receiving spoken commands from a user;
    b) means, responsive to said voice command detect circuit, for recognizing a plurality of said spoken commands and responding by carrying out respective, corresponding functions from instructions stored in memory.

11. A headset system of claim 10 wherein said voice command detect circuit is activated for predetermined period of time which starts when said user operated switch is connected to said microphone by positioning said boom in front of the mouth position.

12. A method of operating said headset system of claim 10 comprising steps of:
    a) connecting said further user operated switch so as to be in a voice command state;
    b) detecting the connection of said state;
    c) activating said voice command detect circuit;
    d) giving a voice command through a microphone;
    e) releasing said further user operated switch to end said voice command;
    f) processing said voice command by said voice command detect circuit;
    g) executing said command.

13. A method as defined by claim 12 wherein said voice command detect circuit activating user operated switch is released before giving said voice command and the end of said voice command is detected by application when a said voice command speech signal is not present.

14. A method as defined by claim 12 wherein said voice command detect circuit is activated for a period of time which starts by connecting and activating said microphone and the ends when said voice command speech signal is not present.

15. The method as defined by claim 12 further comprising ready signal through a speaker for user to start a command after activation of said voice command detect circuit.

16. The method as defined by claim 12 further comprising a designated signal through a speaker indicating processing of said voice.

17. The method as defined by claim 12 further comprising a feed-back, giving a designated signal through a speaker indicating detection of a voice command or alternatively a signal indicating rejection of said voice command.

18. Method of operating a microcontroller based audio system comprising:
   a) providing a microphone for receiving audio speech from a user's mouth and converting it to electric signals;
   b) providing first and second speakers for converting a electric signals to audible sound;
   c) providing a user-operated switch for selectively activating said microphone in a first state or deactivating said microphone in a second state;
   d) selecting said first or said second state of said user operated switch;
   e) providing a resiliently biased momentary switch capable of creating patterns of momentary switching from a rest position to at least depressed position and back;
   f) manipulating said momentary switch in a desired switching pattern;
   g) performing by microcontroller a respective function that is predetermined on the bases of respective states of said user operated switch and said momentary switching pattern and on any existing function being performed by said microcontroller.

19. A method of claim 18, further comprising a step of providing a control signal independent of user input for causing a microcontroller to perform a predetermined function.

20. A method of claim 19, wherein the step of performing of a respective function includes chancing said predetermined function in response to manipulating one or both of said user operated switch and said momentary switch while said control signal exists.

21. A method of claim 19, wherein said control signal is an external signal received by said audio system.

22. A method of claim 19, wherein said control signal is an internal signal generated by said audio system.

23. A method of claim 18 wherein said respective function is context sensitive depending on present system state; state of said user operated switch and an existing function being performed by said microcontroller.

24. A method of claim 18 further comprising the step of detecting the states of said user operated switch and said patterns of momentary switching using threshold logic with more than two logic levels.

* * * * *